US006954443B2

(12) United States Patent
Forstadius et al.

(10) Patent No.: US 6,954,443 B2
(45) Date of Patent: Oct. 11, 2005

(54) SHORT RANGE RF NETWORK WITH ROAMING TERMINALS

(75) Inventors: Antti Forstadius, Tampere (FI); Tomi Heinonen, Tampere (FI)

(73) Assignee: Nokia Corporation, Espoo (FI)

( * ) Notice: Subject to any disclaimer, the term of this patent is extended or adjusted under 35 U.S.C. 154(b) by 908 days.

(21) Appl. No.: 09/803,534

(22) Filed: Mar. 9, 2001

(65) Prior Publication Data

US 2002/0126643 A1 Sep. 12, 2002

(51) Int. Cl.$^7$ .................................................. H04Q 7/00
(52) U.S. Cl. ........................ 370/331; 370/338; 370/401; 455/435.1
(58) Field of Search ................................ 370/330–339, 370/345–347, 401; 455/435.1, 436–440

(56) References Cited

U.S. PATENT DOCUMENTS

| 5,400,338 | A | | 3/1995 | Flammer, III |
| 5,533,026 | A | | 7/1996 | Ahmadi et al. |
| 5,673,031 | A | | 9/1997 | Meier .................... 340/825.08 |
| 5,949,776 | A | * | 9/1999 | Mahany et al. ............. 370/338 |
| 5,995,842 | A | * | 11/1999 | Jonsson ....................... 455/462 |
| 6,006,090 | A | | 12/1999 | Coleman et al. ............ 455/432 |
| 6,041,358 | A | | 3/2000 | Huang et al. |
| 6,046,992 | A | | 4/2000 | Meier et al. ................. 370/338 |
| 6,445,922 | B1 | * | 9/2002 | Hiller et al. ................. 455/433 |
| 6,633,761 | B1 | * | 10/2003 | Singhal et al. .............. 455/436 |

FOREIGN PATENT DOCUMENTS

| EP | 0 426 269 A1 | 5/1991 | ............ H04Q/7/04 |
| EP | 0 663 746 A2 | 7/1995 | ........... H04L/12/46 |
| JP | 11-272997 | 8/1999 | |
| JP | 11-272997 | 10/1999 | ............ G08G/1/14 |
| WO | WO 98/17032 | 4/1998 | |
| WO | WO 98/19400 | 5/1998 | ........... H04B/1/713 |
| WO | WO 99/05877 | 2/1999 | |
| WO | WO 99/53698 | 10/1999 | |
| WO | WO 99/59373 | 11/1999 | |
| WO | WO 00/18025 | 3/2000 | |
| WO | WO 00/69186 | 11/2000 | ............ H04Q/7/20 |
| WO | WO 01/13660 | 2/2001 | ............ H04Q/7/32 |
| WO | WO 01/78246 A1 | 10/2001 | ............ H04B/1/38 |

OTHER PUBLICATIONS

Alberecht M. et al.: "IP Services Over Bluetooth: Leading the Way to a New Mobility" Proceedings Annual Conference on Local Computer Networks. LCN, XX, XX, 1999, pp. 2–11, XP001001314.

Frodigh M. et al., "Wireless AD Hoc Networking—The Art of Networking Without a Network" On Ericsson Review, Ericsson, Stockholm, Se, vol. 77, No. 4, 2000, pp. 248–263, XP000969933.

* cited by examiner

*Primary Examiner*—Ricky Ngo
*Assistant Examiner*—Richard Chang
(74) *Attorney, Agent, or Firm*—Cohen, Pontani, Lieberman & Pavane

(57) ABSTRACT

A short-range RF network deployed at a site larger than the coverage area of a single short-range RF transceiver includes a plurality of short-range RF transceivers deployed with overlapping coverage areas and accessible through a gateway, and accommodates terminal devices to establish communication through any transceivers with the gateway or with other of the terminal devices. The system further includes a WAP/Web server in communication with the Internet and in communication with the gateway. Terminal devices may establish Internet sessions through a node, the gateway, the WAP/Web server, and the Internet with remote Web servers or with remote users, and are assigned PPP IP numbers for such sessions. A terminal device which roams from the coverage area of one node to the coverage area of another node, and which is accordingly assigned a new PPP IP number, may continue in an Internet session by virtue of a shared database associated with the WAP/Web server and updated by the gateway. The shared database enables correlation of the terminal device's current location in the network with the PPP IP number by which Internet communications refer to it.

48 Claims, 8 Drawing Sheets

SHORT RANGE RF NETWORK WITH ROAMING TERMINALS

CROSS-REFERENCE TO RELATED APPLICATIONS

The present application is related to U.S. application Ser. No. 09/614,508, filed Jul. 11, 2000, assigned to the intended assignee of the present application.

BACKGROUND OF THE INVENTION

1. Field of the Invention

The present invention relates to short-range RF networks and, more particularly, to client communication as a client roams through the network.

2. Description of the Related Art

The availability of various types of communication devices produces a need to have these devices interact with each other in a manner which is cost efficient and which can be easily implemented. Such communication can occur between two or more terminal devices (e.g. telephones, computers, printers, facsimile machines, personal digital assistants (PDAs), etc.) by wired connection such as by connecting electrical conductors to the devices, or by wireless communication using infrared signals or radio frequency (RF) signals. For many applications, RF signals are preferred as they do not require line-of-sight interaction between a transmitter and a receiver of a terminal device pair.

Recently, low power RF systems have been proposed for providing communications among a plurality of transceivers through a short range communication link. One such short-range RF technology is currently under development and is known as "Bluetooth". This system will be commercially available in the near future and it operates in the open spectrum around 2.45 GHz. This unlicensed radio band, known as the Industrial-Scientific-Medical (ISM) band, is globally available. The operating range of the Bluetooth RF system is approximately 10 meters for a normal power mode, and has proven to be economically efficient.

Depending on the available bandwidth of the country, (in parts of Europe and the U.S., a bandwidth of 83.5 MHz. is available, which is wider than the band available in Japan, Spain, and France) either 79 or 23 RF channels are used, the channel separation being 1 MHz. The channel is represented by a pseudo-random hopping sequence through the 79 or 23 RF channels. The hopping is unique in a small area, called a piconet. One of the Bluetooth devices in the piconet functions as a master and the others as slaves.

Each channel is further divided into time slots, each 625 ls in duration, during which packets can be transmitted by the master and slaves. It is planned that Bluetooth chips having the described characteristics will be installed in various kinds of electronic devices for enabling communication among the separate devices.

Wireless relay networks also exist which, in effect, extend an operating range of a local RF system by utilizing relay devices to interface with and provide communication between two or more terminal devices. Such a network is disclosed in PCT Application No. WO 98/17032 wherein a plurality of communication nodes are wirelessly connected to each other and to a host device for providing numerous communication links for data to be communicated between the host and terminal devices interfaced with the nodes.

Such systems, when deployed in such places as department stores and shopping malls, have been extended to provide unsolicited advertising and promotional messages to terminal devices. Such systems have also been extended to include Internet servers which allow a terminal device connected to the short-range wireless relay network to initiate an Internet session. However, such systems experience drawbacks when a user on a terminal device roams from the coverage area of one transceiver into the coverage area of another. One drawback of such a system is that a terminal device's Internet address changes as it roams from one node's coverage area into another, effectively terminating any Internet sessions that may have been in progress, thereby requiring new Internet connections to be made as the terminal device roams. Another drawback of such a system is that local content supplied to a terminal device according to its location when it initiated communication may no longer be appropriate after it roams to a different transceiver's coverage area.

SUMMARY OF THE INVENTION

To overcome limitations in the prior art described above, and to overcome other limitations that will become apparent upon reading and understanding the present specification, the present invention discloses a system, apparatus and method for communicating services to a wireless terminal operating within a wireless short-range network while the wireless terminal is moving through the short-range network. The wireless terminal is not limited to any present navigation structure, and provides the ability to remotely access services.

One aspect of the invention provides a short-range RF network comprising a plurality of nodes connected wirelessly to each other, and to at least one resource; at least one mobile device wirelessly communicating with at least one of the plurality of nodes, and capable of roaming out of one node's coverage area into another node's coverage area; and a periodically updated first database for maintaining information concerning the at least one mobile device currently in communication with at least one of the plurality of nodes for each node of the short-range RF network; the at least one resource having a periodically updated second database including information concerning the plurality of nodes of the short-range RF network and relative information concerning the first databases of each node of the short-range RF network; the at least one mobile device being arranged to send a user-initiated request for data using the short-range RF network, the network being arranged to forward said request to the at least one resource; the at least one resource being arranged to provide the requested data via the network to a node communicating with the at least one mobile device according to the periodically updated relative information concerning the first databases stored at the second database of the at least one resource.

Another aspect of the invention provides a method of operating a short-range RF network, the network comprising a plurality of nodes connected wirelessly to each other, and to at least one resource; and at least one mobile device wirelessly communicating with at least one of the plurality of nodes, and capable of roaming out of one node's coverage area into another node's coverage area; and the method comprising the steps of periodically updating a first database for maintaining information concerning the at least one mobile device currently in communication with at least one of the plurality of nodes for each node of the short-range RF network; in the at least one resource, periodically updating a second database including information concerning the plurality of nodes of the short-range RF network and relative information concerning the first databases of each node of the short-range RF network; sending a request for data using the short-range RF network, the request initiated by a user of the at least one mobile device and forwarding the request to the at least one resource; and providing the requested data to a node communicating with the at least one mobile device according to the periodically updated relative information concerning the first databases stored at the second database of the at least one resource.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference numerals denote similar elements throughout the several views.

DETAILED DESCRIPTION OF THE PRESENTLY PREFERRED EMBODIMENTS

In the following description of the various embodiments, reference is made to the accompanying drawings which form a part hereof, and in which is shown by way of illustration various embodiments in which the invention may be practiced. It is to be understood that other embodiments may be utilized and structural and functional modifications may be made without departing from the scope of the present invention.

Figure 1:
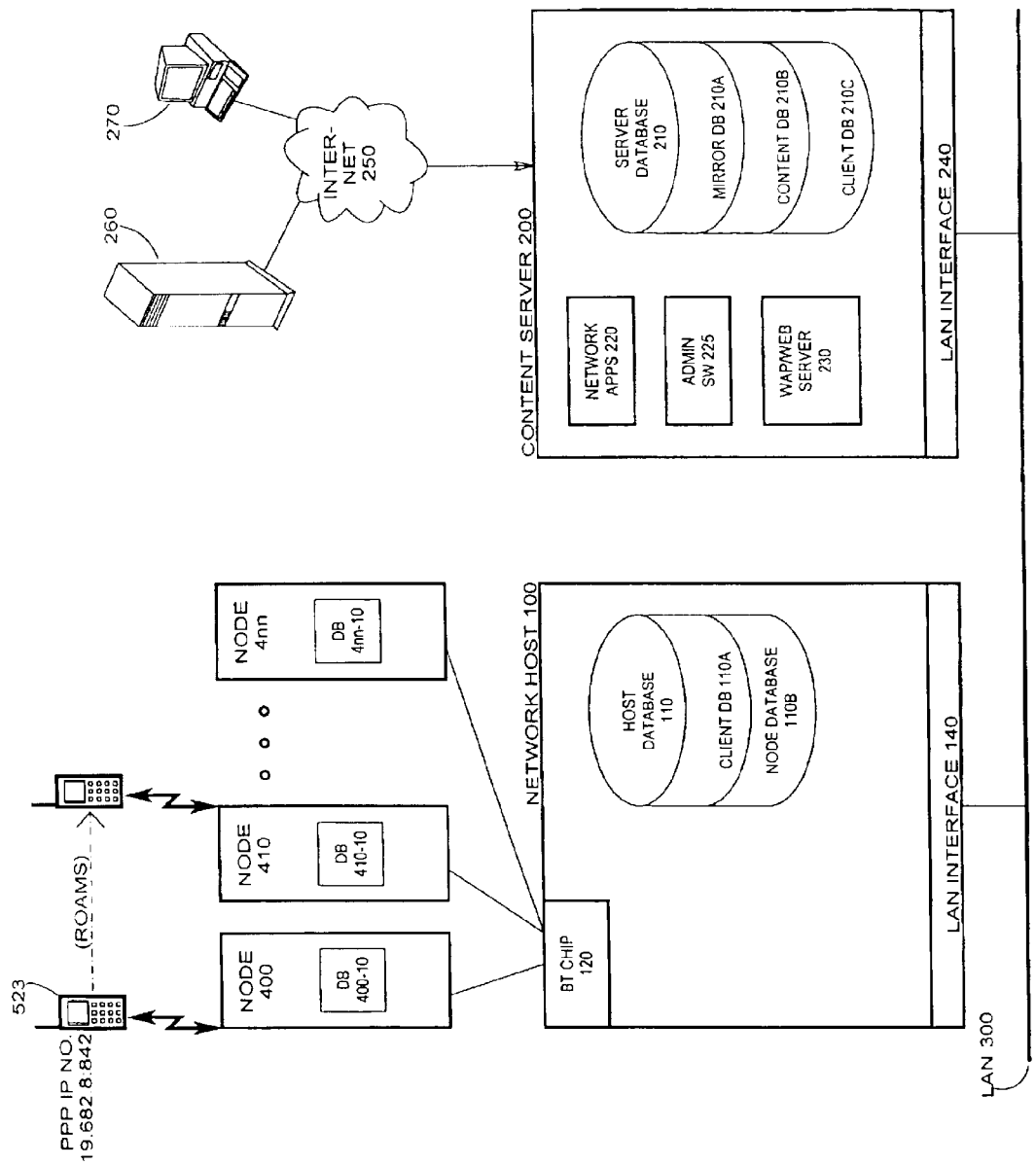
FIG. 1 is a block diagram of a short-range RF network embodying a system in which the present invention may be practiced.

FIG. 1 is a block diagram of one embodiment of a communication system according to the present invention. Such a system would typically be deployed in a site such as a department store, shopping mall, or factory floor, i.e., an area that is relatively small, but yet is larger than could be covered by a single short-range RF transceiver which typically has a maximum range of less than 100 meters. A plurality of short-range RF transceivers 400 through 4$nn$ are deployed as nodes and are physically positioned so as to cover the entire site, with each covering a particular portion of the site. Each node includes a node database 400-10, 410-$n$. . . 4$nn$-10. There typically is overlap between the coverage areas of two adjacent nodes.

A plurality of users can use the system. Each must be equipped with a terminal capable of short-range RF communication. The terminals are denominated in this exemplary system with numbers 500 through 5$nn$. Only one such terminal device, arbitrarily identified as 523, is illustrated in the example of FIG. 1. The terminal device (the "client" of the system) is typically (but is not limited to) a mobile telephone that is equipped to function in conjunction with a mobile telephone system such as the cellular or GSM systems, as well as with short-range RF nodes. The terminal device typically can function for both voice and data communication. Data communication capability of the terminal device typically includes compatibility with the wireless application protocol (WAP) standard used on the world-wide web.

The inventive system includes at least one network host 100 which coordinates the activities of nodes 400-4$nn$, including the reception and transmission of voice and data. In the example of FIG. 1, all the illustrated nodes are shown as communicating directly with the network host 100. In some deployments, some of the nodes may not be within range of network host 100 and would communicate with network host 100 by relaying through other of the nodes. Such routing is discussed in related application Ser. No. 09/614,508.

A user of a terminal device initiates communication with a node in the coverage area of which the user is currently located. In the example given in FIG. 1, a user of terminal device 523 initiates communication with node 400, which in turn links the user through Bluetooth chip 120 to network host 100. The user might converse with users at other terminal devices (not shown) or the user might choose to communicate via Internet 250 with a web server such as 260, or a remote user such as 270. Network host 100 includes LAN interface 140, which links network host 100 to content server 200 via LAN 300. Content server 200 includes WAP/Web server 230 which links the desired communication to Internet 250. Network host 100 in conjunction with content server 200, with its content database 210B and its ability to communicate over Internet 250, together comprise a resource for obtaining content upon a user's request.

Network host 100 includes host database 110, which is divided into client database 110A and node database 110B.

Client database 110A stores client-dependent information for each client, including:

Client Address (i.e., the Bluetooth Address of the Client)

Node Address (i.e., the node through which the client is connected)

IP Number of the Client

Port number of the Client

Client Status (active/inactive)

Node database 110B stores node-dependent information, including:

All the information associated with the routing and connections between nodes

Connection settings (parameters that are sent to the client when the connection is formed between a client and the node). These parameters are applied on the client's behalf when accessing information from the server, e.g., WAP service URL. (Node identification is included in the URL and forms the basis for location dependent services)

Node dependent information including alias names and other settings.

Information regarding clients which have been within the network coverage area within a predetermined preceding time.

Content server 200 is typically a PC, equipped with at least the following software:

WAP/WEB Server 230 (WAP or WEB according to the type of clients)

Network applications 220 (a collection of servlets or other software components for providing client services, including location-dependent services)

Administration software 225 (applied in configuring the nodes and the network)

Content server 200 includes server database 210, which in turn includes a mirror copy 210A of the host database 110; content database 210B; and client database 210C.

Content database 210B includes general content and location- and time-dependent Information (e.g., maps, advertisements that are destined for particular nodes only, etc.). There are several keys to this database, such as node address/node alias name, type of content (advertisement, warning, map, announcement, etc.), broadcast schedule, and keywords.

Client database 210C contains:

Personalization information, which can be applied in order to generate personalized content. This information is accessed according to the client address.

Temporary content (stores the current state and content of the client connection and can be applied in handoff, i.e., when the client moves out of range of the initial node and forms a connection to another node).

Administration software 225 includes an application that can open the node database 110B and save the contents in mirror database 210A. Administration software 225 allows the network operator to modify node database 110B (e.g., to give alias names and connection parameters) and save the changes to network host 100, which distributes the changes to the nodes.

Content database 210B can directly include content (e.g., text), or it can include links to other content source (e.g., URL's pointing to WAP decks). Each database entry includes a list of node addresses or alias names that describes which nodes should receive the current content. Content may be streaming content, such as stock reports that continuously and repetitively scroll across the user's screen, or one-time content comprising a discrete, non-repeating portion.

When a client enters the range of a node, the Bluetooth INQUIRY procedure is used for the Bluetooth transceivers in the node and in the client device to learn of each other and to acquire each other's Bluetooth addresses. Thereafter, a PPP-connection is formed and the client is assigned an IP number and a Port (the client can be contacted from outside the network by using the network host's IP number and the client's Port number). The corresponding information (Client Address, Node Address, Client's IP number, Client's Port number) is stored in client database 110A. Connection parameters (e.g., WAP connection parameters, such as URL) are sent to the client and thereafter the client requests corresponding information (e.g., WAP deck) from the network.

The requested URL uniquely identifies the client to the servlet. The URL also includes several parameter fields that are transmitted to the servlets (client address and node address).

The contacted servlet generates content for the client by searching content database 210B (location dependent). If the client has been personalized in the databases it is possible to personalize the generated content (and also filter the content).

The Servlet/WAP server sends the generated content to the client by applying the IP:Port address. If the client's IP:Port cannot be resolved directly from the content server, it can be requested from the host (as keyed according to the client address). The client receives the content and can follow links and request additional content.

Content (e.g., WAP decks) and other connection parameters are stored as temporary content in client database 210C. This temporary content portion of client database 210C database serves as a cache memory, and can be used to preserve parameters during handoff.

When a client is connected to a node, its status is marked "active" in the client database. The client remains connected as long as it is located inside the node's Bluetooth range. When the connection is no longer possible (e.g. client out of range), the connection is terminated. That information is transferred by the node to the network host (status is marked as inactive).

The last sent content remains in the temporary content portion of client database 210C. When the client connects to another node and the node/client requests a URL, it is realized that the previous connection was recently terminated. In such a case, the content located in the temporary content portion of client database 210C is transmitted to the client. Exceptions to this are the cases where the delay between the terminated and new connection is sufficiently long (e.g., 1 hour), and the case where the client is using services that update content every time a node is changed (e.g., routing services and maps).

When a new connection to a node is formed and location dependent content is generated, and there is information in the temporary content, the old and new information can be combined and sent to the client.

The organization of host 100 and content server 200 as two separate physical entities is a design expedient in a particular embodiment, and is not intended to limit the invention to that configuration. The components of host 100 and content server 200 could exist within other numbers of physical entities, including a single central resource.

Figure 2:
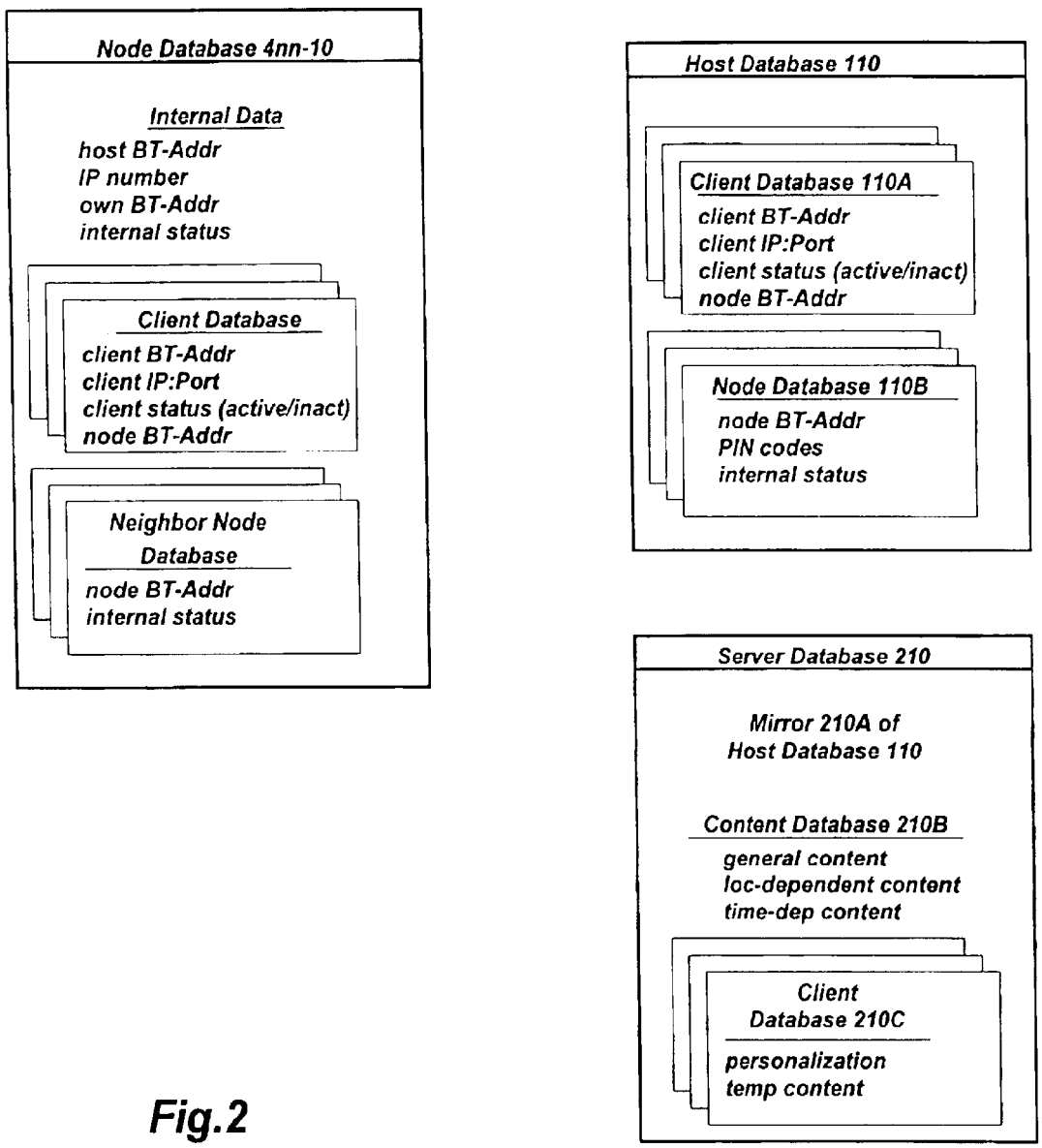
FIG. 2 summarizes the contents of various databases according to one embodiment of the present invention.

The contents of the databases used in connection with the embodiment discussed above are summarized in FIG. 2. FIG. 2 also shows that each node 4nn has a node database 4nn-10, which stores internal data for use by the node, a client database for containing node-related client data for each client currently connected to the node, and a neighbor node database for containing data regarding the node's neighbors.

Figure 3:
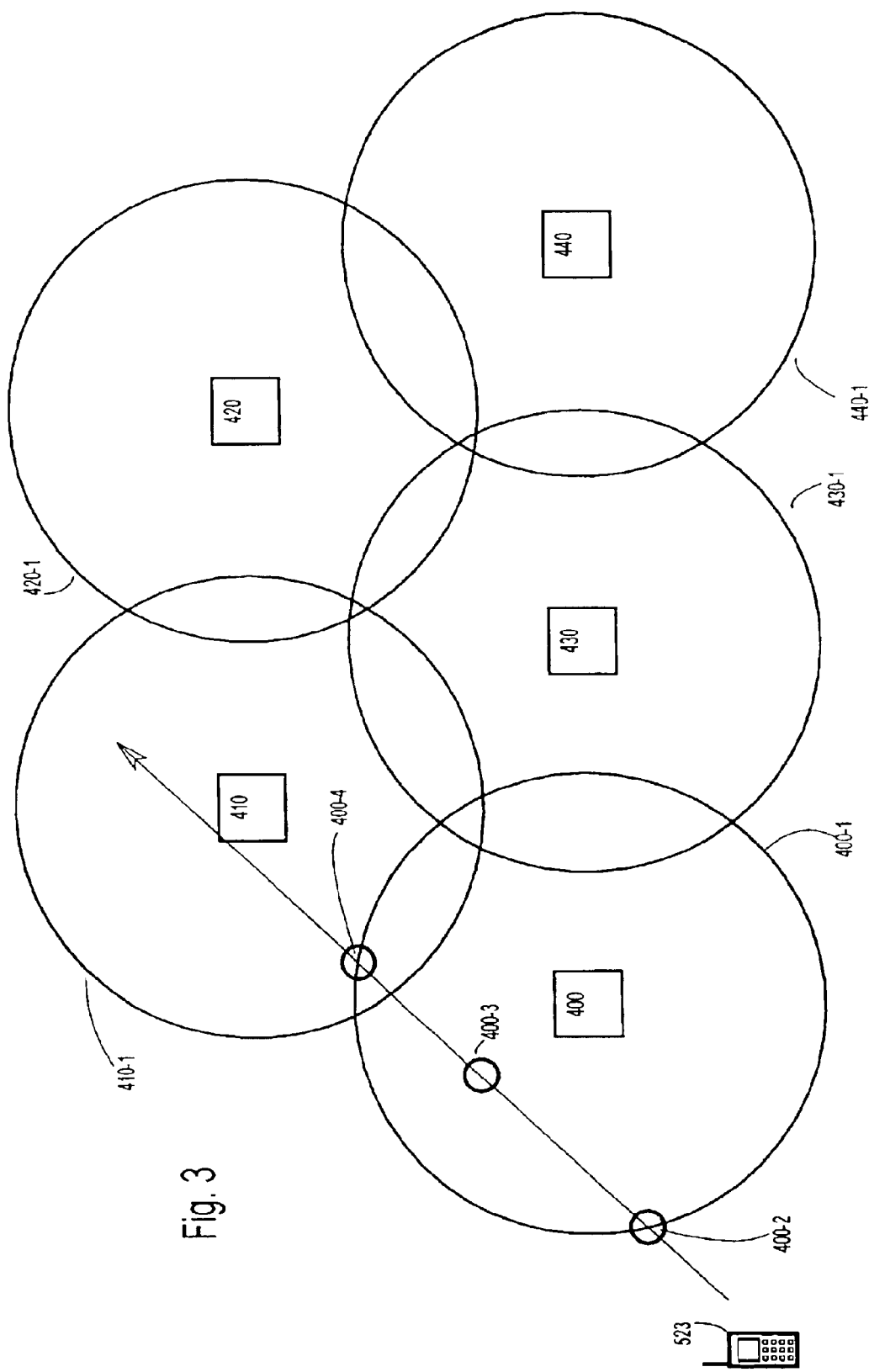
FIG. 3 shows a typical scenario of a client roaming through one embodiment of a system of the present invention.

The operation of the inventive system will now be discussed comprehensively in terms of the actions engendered by a typical client roaming through the system. FIG. 3 depicts a portion of a typical deployment wherein nodes 400, 410, 420, 430, and 440 have overlapping coverage areas 400-1, 410-1, 420-1, 430-1, and 440-1 respectively. A client 523 enters the coverage area of the system when he enters coverage area 400-1 at point 400-2. At point 400-3 in the present example, client 523 requests network server content through internet 250 (see FIG. 1). At point 400-4 the client passes out of coverage area 400-1 and enters coverage area 410-1. The ensuing discussion shows how the inventive system seamlessly preserves client 523's connection to network server content.

Figure 4:
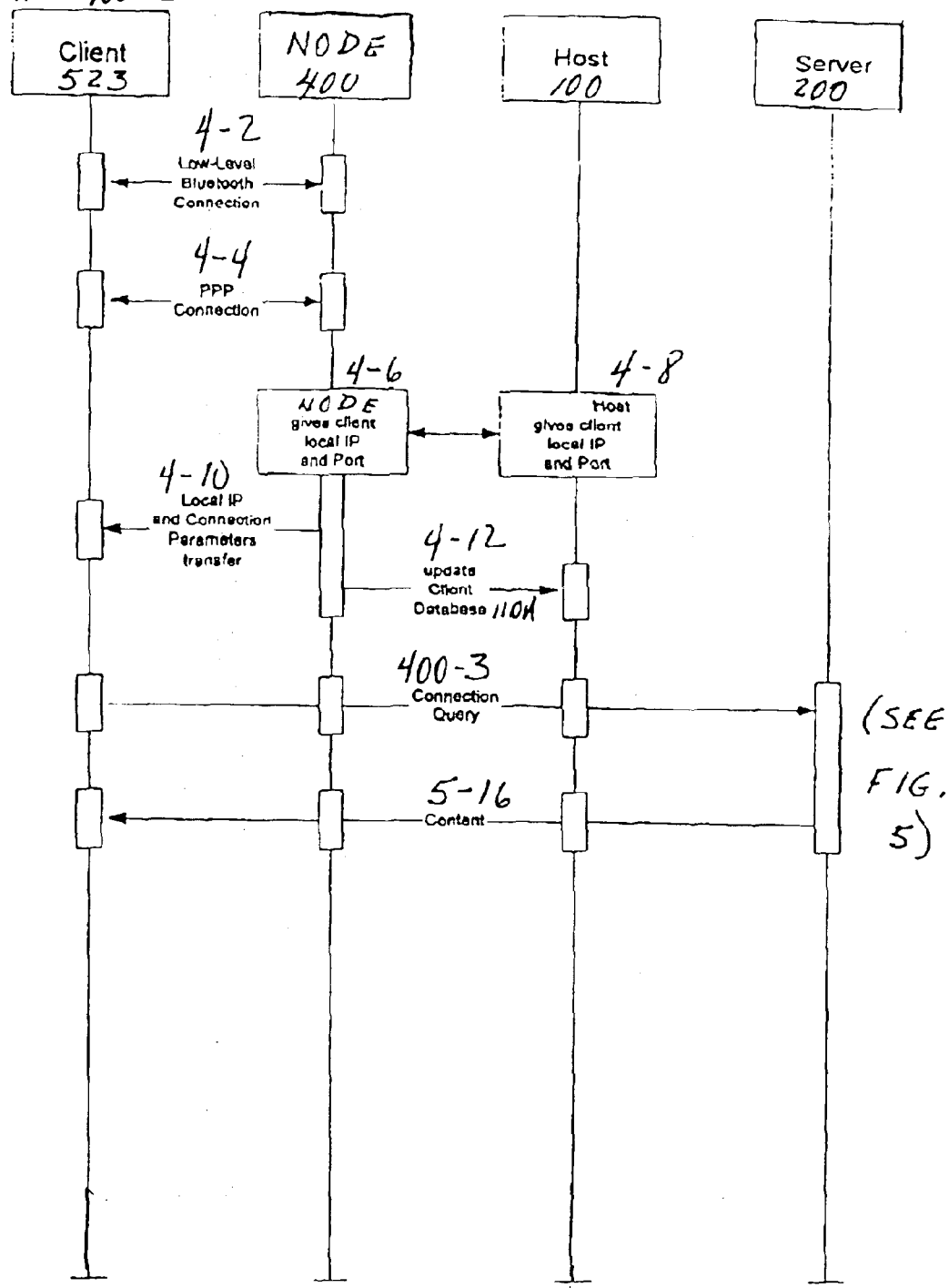
FIG. 4 is an exemplary system flow diagram of the handling of a client upon entering the coverage area of a node.

The flow in FIG. 4 is entered when client 523 enters node 400's coverage area at point 400-2 (as shown on FIG. 3).

Both node 400 and client 523 are periodically performing the inquiry procedure provided, e.g., in the case of Bluetooth network, the Service Discovery Protocol (SDP) according to the Bluetooth specification for learning of other BT transceivers within a transceiver's coverage areas. Step 4-2 indicates that client 523 and node 400 learn each other's BT addresses, known in the art as forming a low-level BT connection. Step 4-4 indicates that node 400 initiates a PPP connection with client 523. In blocks 4-6 and 4-8, node 400 and host 100 determine an available port number to be assigned to client 523; step 4-10 conveys an IP:Port number to client 523, exemplarily stated in FIG. 1 to be 147.19.202.8:842, where the 147.19.202.8 portion is an IP number associated with the present short-range RF network, and 842 is the port number assigned in blocks 4-6 and 4-8. In step 4-12, client database 110A is updated with the information pertaining to client 523's new connection.

As noted in connection with FIG. 3, client 523 requests at point 400-3 to receive content. By means discussed in connection with FIG. 5, the requested content is obtained and forwarded in step 5-16 to client 523.

Figure 5:
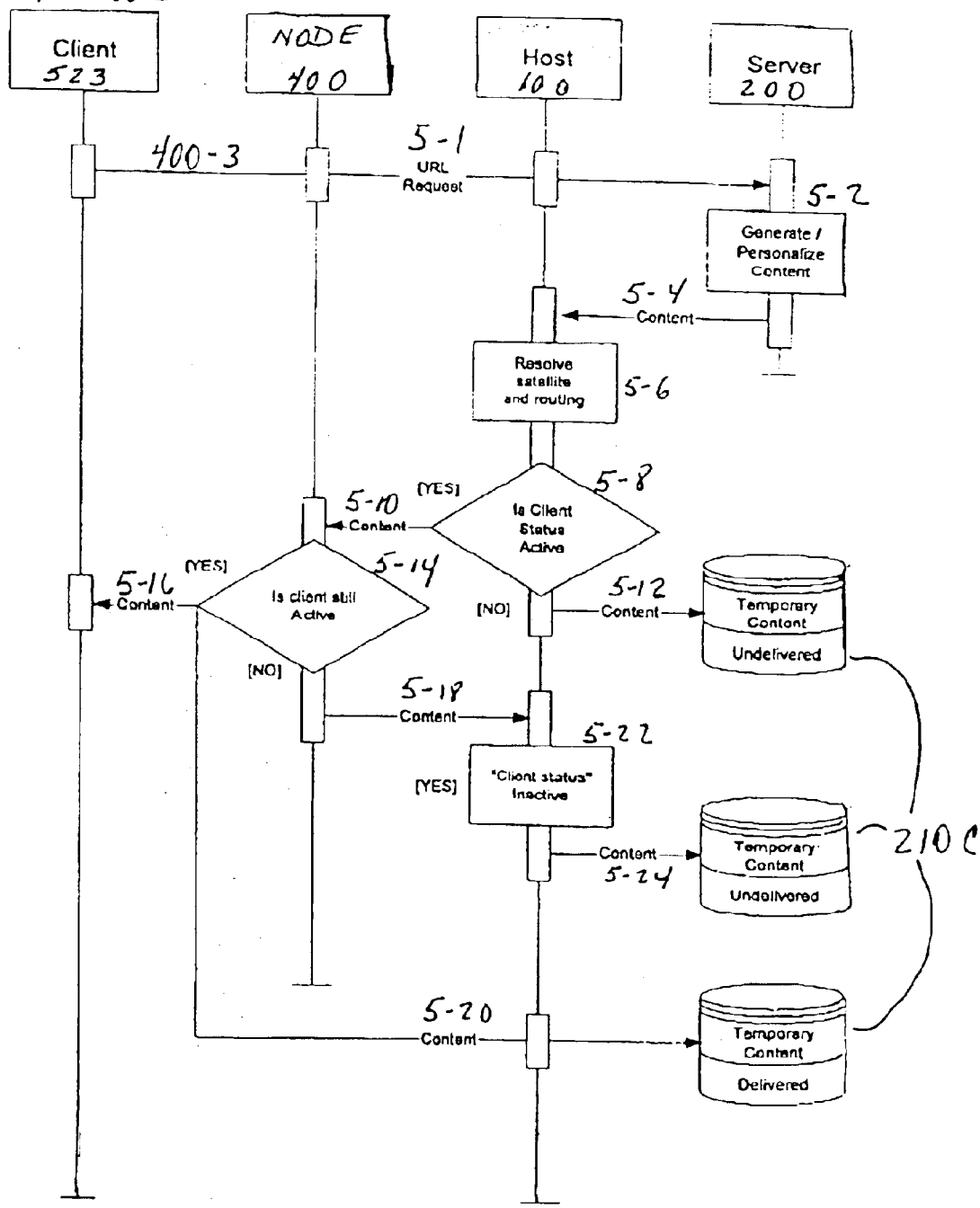
FIG. 5 is an exemplary system flow diagram of handling of a client request for server content.

In FIG. 5, step 400-3 indicates the client's request for content, which is forwarded to node 400, which in turn in step 5-1 forwards a URL request through host 100 to server 200, where in block 5-2 content is generated and personalized. This may entail retrieving content from content database 210B, or obtaining content from a remote server over Internet 250, not described. Step 5-4 indicates forwarding the content to host 100 where in block 5-6 the node and routing are determined from consulting client database 110A. In block 5-8 it is checked whether the client still has active status; thus far in the present example, client 523 is active on node 400, so the content is forwarded in step 5-10 to node 400. If the client has left the coverage area of the node, step 5-12 results in storing the transmitted data in storage 210C In block 5-14 the client's status is again verified as active; step 5-16 forwards the content to client 523. Step 5-20 results in updating client database 210C to mark that content temporary as delivered. If the client has left the coverage area of the node, step 5-24 results in storing the content in storage 210C. Forwarding that content upon the client's return will be discussed in connection with FIG. 7.

In the present example, client 523 leaves coverage area 400-1 at point 400-4, and thus his status changes to inactive. Also in the present example, the content requested by client 523 is of an ongoing nature, and continues to emanate from block 5-2. In block 5-8, it is determined that the client's status is inactive, and the content is stored in temporary content database 210C and marked undelivered. The content remains in database 210C for a predetermined time, in case the user returns to the network within that time. Conceivably, block 5-8 detects that a client is active and routes content to node 400 an instant before host database 110A is updated to indicate the client's inactive status, and step 5-10 is performed to forward the content to node 400; block 5-14 detects the inactive status and performs step 5-18 to route the content back for storage in database 210C.

Figure 6:
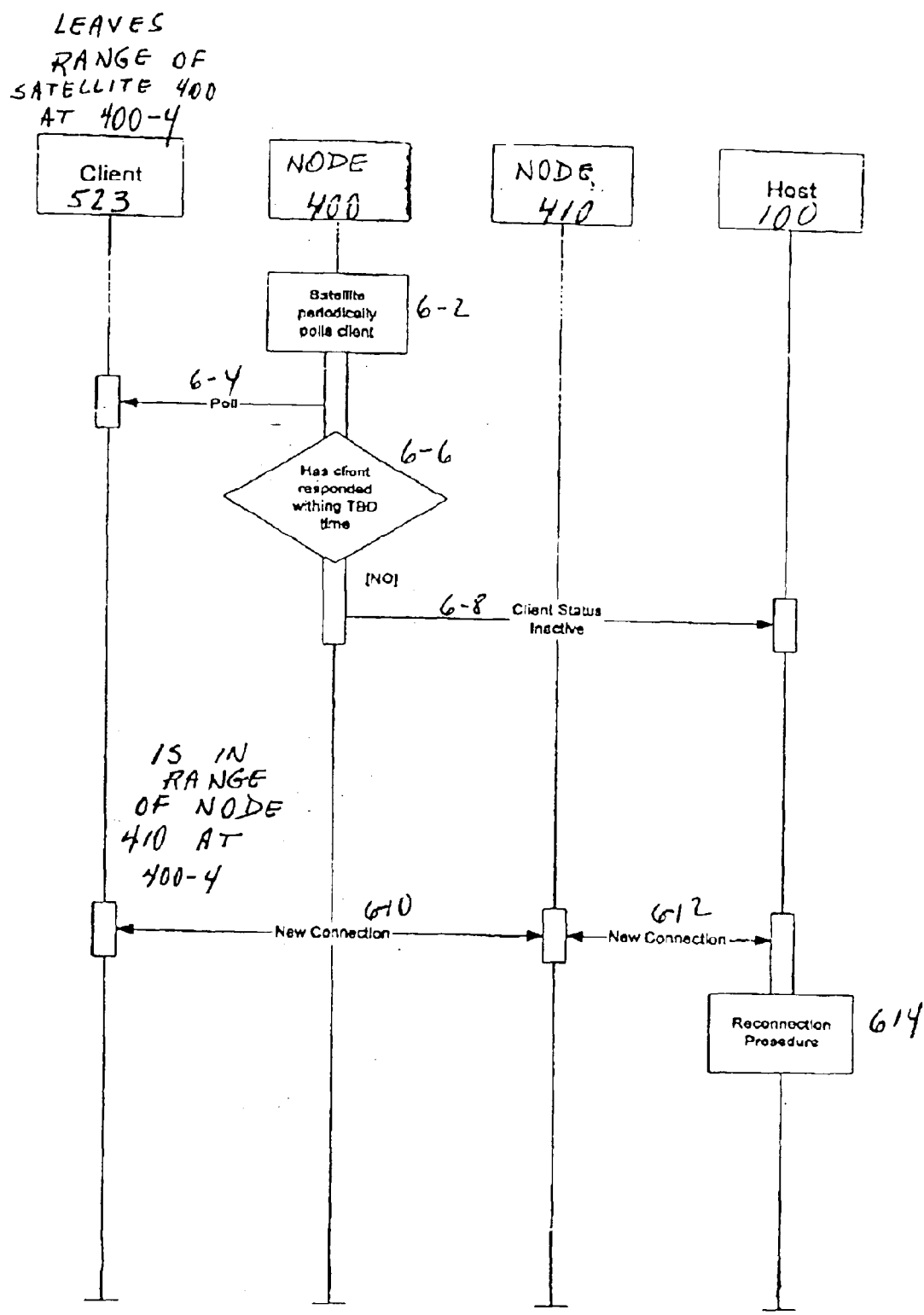
FIG. 6 is an exemplary system flow diagram of handling of client with a pending server-content request leaving the coverage area of a node.

As shown at block 6-2 of FIG. 6, node 400 periodically polls all its current active clients, including client 523 (step 6-4); after client 523 has left coverage area 400-1 it will no longer respond. This is detected in block 6-6, and step 6-8 is performed to update client 523's status to inactive in host 100. In the present example, client 523 has come into the coverage area of node 410, and through the aforementioned inquiry procedure forms a low-level BT connection with node 410 (steps 6-10 and 6-12), which invokes reconnection procedure 6-14, which establishes a new connection with node 410 in the same manner as the prior connection with node 400 was established, as was discussed in conjunction with FIG. 4. In the present exemplary scenario the client 523 entered the range of node 410 immediately after leaving the range of node 400, but it is to be understood that the present system and method also provides reconnection for a user who has entered the range of a node some time after leaving the range of node.

Figure 7:
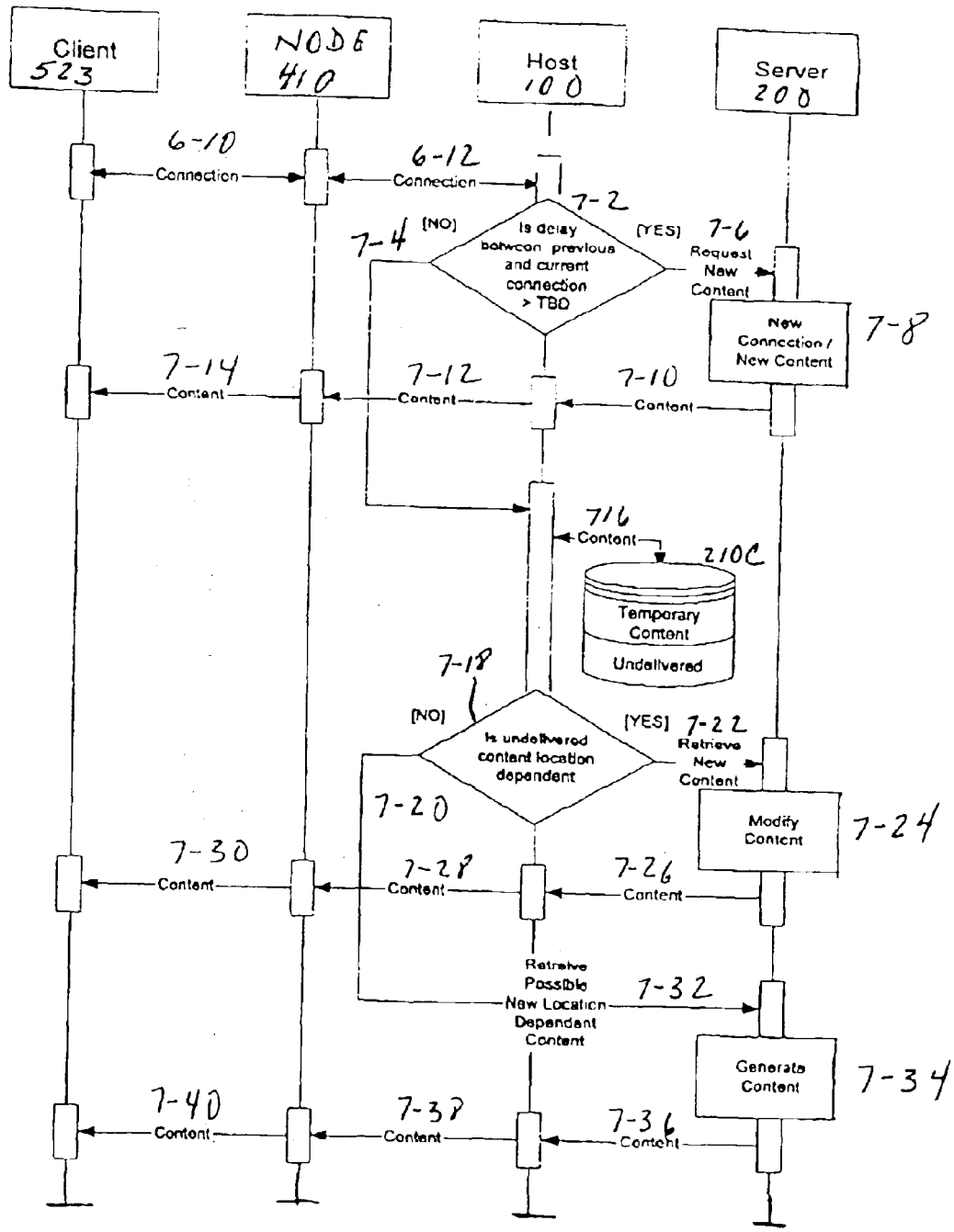
FIG. 7 is an exemplary system flow diagram of handling a client's session after reconnection to a different node.

Referring now to FIG. 7, upon reconnection block 7-2 checks whether client 523 had been disconnected for longer than a predetermined time, typically preset to a value on the order of five minutes to an hour. Client 523's former IP:Port is reserved for this length of time, and if reconnection takes place within that time the same IP:Port is reassigned to client 523, in which case step 7-4 dispatches towards retrieving content which was being stored on client 523's behalf. If client 523 was disconnected for longer than the predetermined time, step 7-6 invokes block 7-8 to provide a new IP:Port and to start sending content afresh (steps 7-10, 7-12, 7-14). This predetermined waiting period prevents a client 5nn, newly connected and given by chance the IP:Port that client 523 formerly had, from unexpectedly receiving portions of the content that client 523 had requested.

If path 7-4 is taken, step 7-16 is invoked to retrieve the previously stored content from database 210C, and block 7-18 determines from the content whether it is still valid for client 523's current location. Content is accordingly forwarded to client 523 (steps 7-36, 7-38, 740), modified for client 523's present location and then forwarded (block 7-24 and steps 7-26, 7-28, and 7-30), or generated anew for client 523's present location (block 7-34 and steps 73-6, 7-38, and 7-40).

Figure 8:
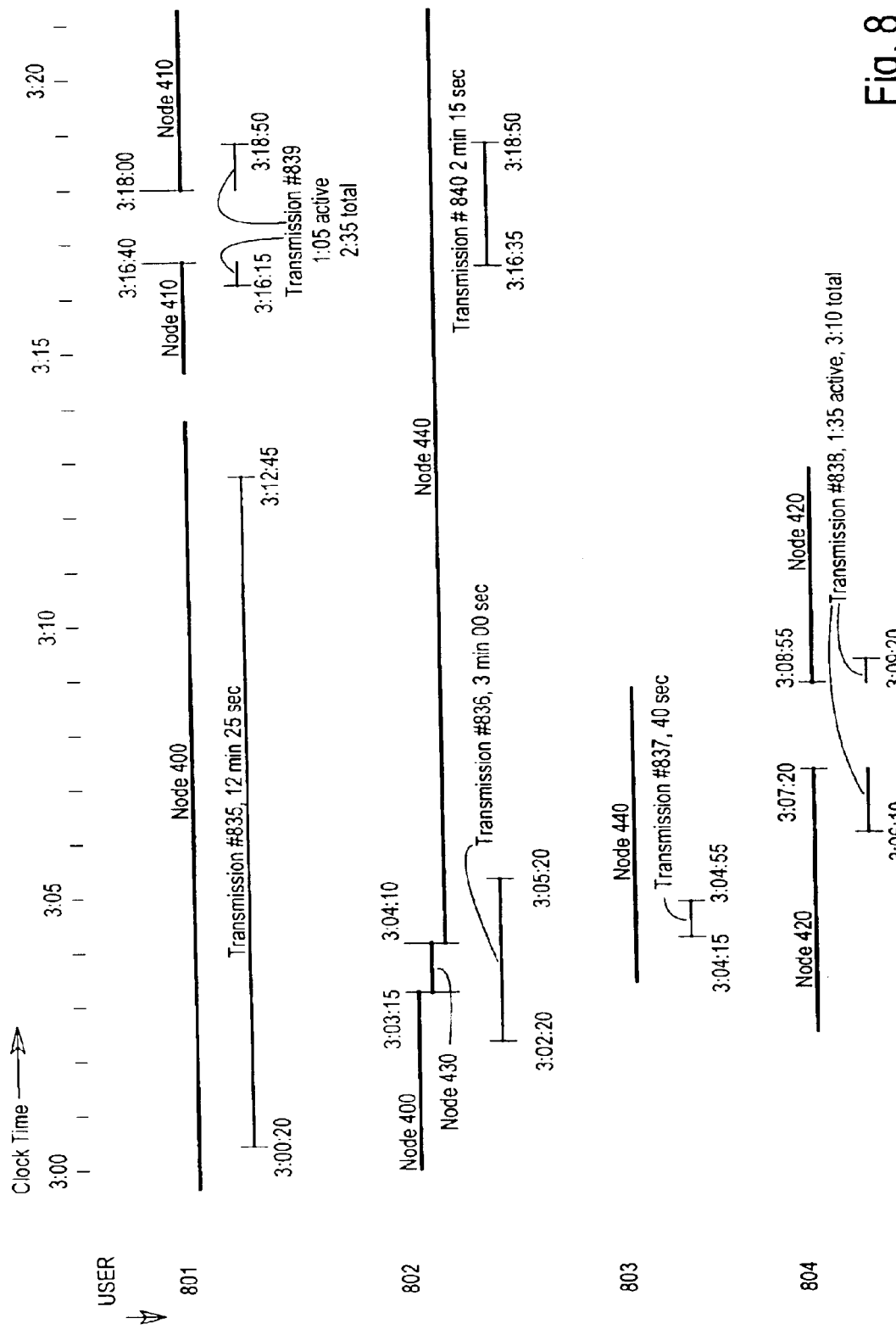
FIG. 8 is a diagram illustrating the timing of exemplary roaming of clients through the network.

FIG. 8 illustrates a typical scenario that might occur as several users roam through the environment depicted in FIG. 3. A user 801 is already in the coverage area of node 400 at 3:00o'clock, the start of the exemplary time period. At 3:00:20 in the exemplary scenario, user 801 requests content, perhaps from a server 260 on the Internet as discussed above. User 801's request initiates transmission 835, which might, for example be a continuous streaming scroll of stock price quotes. User 801 might request termination of the transmission at 3:12:34. Transmission 835 thus was 12 minutes and 25 seconds in duration, during which time user 801 remained continuously in the coverage area of node 400, so there was no need to suspend the transmission.

A little before 3:14, user 801 leaves the coverage area of node 400, at such a position that he does not pass into any other coverage areas. A little before 3:15 user 801 enters the coverage area of node 410. At 3:16:15, user 801 requests content, which starts arriving at his mobile terminal in transmission 839. At 3:16:40 he roams out of the coverage area of node 410, in such a manner as not to enter any other coverage area. As described supra, the content intended for him is buffered for a predetermined time. At 3:18:00, user 801 re-enters the coverage area of node 410, at which time the content that was buffered and any subsequent requested content are transmitted to user 801's mobile terminal. At 3:18:50, transmission 839 is complete, perhaps because all requested content were sent or perhaps because user 801 signified that he did not wish to receive any more of that content. Transmission 839 thus lasted for a total of two minutes and 35 seconds, one minute and five seconds of which were involved with actual transmission.

In the meanwhile, user 802 was also in the coverage area of node 400 at the start of the exemplary time period. At 3:02:20 he requests download of some content, and transmission 836 commences. At 3:03:15, with transmission 836 still in progress, user 802 leaves the coverage area of node 400, but enters the coverage area of node 430. As described supra, transmission 836 continues through node 430. At 3:04:10, with transmission 836 still in progress, user 802 roams out of node 430's coverage area and into that of node 440. Transmission 836 continues, now through node 440. At 3:05:20, transmission 836 completes.

Transmission 836 thus has a duration of 3 minutes, all of it active although through three different nodes.

At 3:16:35, user 802 requests a content download, and that initiates transmission 840. User 802 remains within range of node 440 until the transmission completes at 3:18:50. Transmission 840 thus has a duration of two minutes and 15 seconds, entirely active (no content buffered).

Similarly, user 803 is in range of node 440 when he requests a download at 3:04:15, which causes the initiation of transmission 837. He remains in range of node 440 until transmission 837 completes at 3:04:55. Transmission 837 thus has a duration of 40 seconds, all of it active (no content buffered).

User 804 enters the coverage area of node 420 at around 3:02. At 3:06:10 he requests a content transmission, which causes the initiation of transmission 838. At 3:07:20, user 804 roams out of range of node 420, but not into the coverage areas of any other nodes. As discussed supra, content from transmission 834 are buffered pending determination of whether user 804 will return. At 3:08:55 user 804 roams back into range of node 420. Buffered content, as well as any subsequent content from the source, are transmitted to user 804 before transmission 838 concludes at 3:09.20. The duration of transmission 838 was this 3 minutes and ten seconds, of which one minute and 35 seconds were occupied with active transmission (70 seconds from 3:06:10 until 3:07:20, and 25 seconds from 3:08:55 until 3:09:20.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A short-range RF network, the network comprising:
    a plurality of nodes connected wirelessly to each other, and to at least one resource;
    at least one mobile device wirelessly communicating with at least one of the plurality of nodes, and capable of roaming out of one node's coverage area into another node's coverage area; and
    a periodically updated first database for maintaining information concerning the at least one mobile device currently in communication with at least one of the plurality of nodes for each node of the short-range RF network;
    the at least one resource having a periodically updated second database including information concerning the plurality of nodes of the short-range RF network and relative information concerning the first databases of each node of the short-range RF network;
    the at least one mobile device capable of sending a user-initiated request for data using the short-range RF network,
    the network being arranged to forward said request to the at least one resource;
    the at least one resource being arranged to provide the requested data via the network to a node communicating with the at least one mobile device according to the periodically updated relative information concerning the first databases stored at the second database of the at least one resource; and
    wherein the node receiving the requested data is arranged to determine whether the at least one mobile device is still in communication with said node, and, if the at least one mobile terminal is still in communication with said node according to the periodically updated information stored at the first database, said node forwards the requested data to the at least one mobile device.

2. The short-range RF network according to claim 1, wherein if said node determines that the at least one mobile device is not in communication with said node according to the periodically updated information stored at the first database, said node forwards the requested data to a periodically updated third database for temporary storing.

3. The short-range RF network according to claim 1, wherein the first database is located within each node of the short-range RF network respectively.

4. The short-range RF network according to claim 1, wherein if the periodically updated relative information concerning the first databases stored at the second database of the at least one resource indicates that the at least one mobile device is not in communication with any of the plurality of nodes, the requested data is sent to a periodically updated third database for temporary storing.

5. The short-range RF network according to claim 4, wherein if the periodically updated relative information concerning the first databases stored at the second database of the at least one resource indicates that the at least one mobile device has returned to communication with any of the plurality of nodes, the requested data is retrieved from the third data base and forwarded to the at least one mobile device.

6. The short-range RF network according to claim 4, wherein if the periodically updated relative information concerning the first databases stored at the second database of the at least one resource indicates that the at least one mobile device has returned to communication with a different one of the plurality of nodes, and if the requested data stored in third data base is pertinent only to a coverage area of a node with which the at least one mobile device was last in communication, data pertinent to said different one of the plurality of nodes is forwarded to the at least one mobile device.

7. The short-range RF network according to claim 1, wherein the at least one resource includes a node selected to be a control node of the short-range RF network capable of communicating with other nodes of the short-range RF network and with the at least one mobile device, the control node being associated with a periodically updated first database for maintaining information concerning the at least one mobile device currently in communication with said control node.

8. The short-range RF network according to claim 1, wherein the at least one resource is further a gateway to other networks.

9. The short-range RF network according to claim 1, wherein at least one of the plurality of nodes is located outside the coverage area of the at least one resource and communicates with said at least one resource by relaying through at least one other node of the plurality of nodes.

10. The short-range RF network according to claim 1, wherein the short-range RF network is a Bluetooth network.

11. The short-range RF network according to claim 1, wherein the requested data comprises continuous repetition of a predetermined set of data items.

12. The short-range RF network according to claim 11, wherein the content of the data items is subject to updating to a value current for each repetition.

13. The short-range RF network according to claim 12, wherein the requested data remains requested until actuation of a predetermined signal from the mobile terminal.

14. The short-range RF network according to claim 1, wherein the requested data has a predetermined length and wherein the requested data ceases to be requested after transmission of the predetermined length of data.

15. The short-range RF network according to claim 1,
wherein the at least one resource has access to a periodically updated fourth database including information concerning mobile devices which were formerly in communication with any of the plurality of nodes during a predetermined time period; and
when at least one other mobile device enters into the coverage area of any node of the plurality of nodes of the short-range RF network, the at least one resource determines whether the at least one other mobile device has been in communication with any of the plurality of nodes of the short range RF network during said predetermined time period; and
if the information stored at the periodically updated fourth database indicates that the at least one other mobile device has been in communication with any node of the plurality of nodes of the short-range RF network during said predetermined time, the at least one resource scans through periodically updated third database to determine whether there is still requested data at the temporary storage, and if requested data exists at the temporary storage, the at least one resource provides said data to a node communicating with the at least one other mobile device according to the periodically updated information stored at the second database.

16. The short-range RF network according to claim 15, wherein
the node receiving the data packet determines whether the at least one other mobile device is still in communication with said node according to the periodically updated information stored at the first database, and;
if the at least one other mobile device is still in communication with said node according to the information stored at the first database, said node forwards the requested data to the at least one other mobile device.

17. The short-range RF network according to claim 16, wherein if said node determines that the at least one other mobile device is not in communication with said node according to the periodically updated information stored at the first database, said node forwards the requested data to the periodically updated third database for temporary storing.

18. The short-range RF network according to claim 15, wherein the at least one resource includes a node selected to be a control node of the short-range RF network capable of communicating with other nodes and with the at least one other mobile device, the control node comprising a periodically updated first database for maintaining information concerning the at least one other mobile device currently in communication with said control node.

19. The short-range RF network according to claim 15, wherein the at least one mobile device and the at least one other mobile device is the same device.

20. The short-range RF network according to claim 15, wherein the at least one resource is further a gateway to other networks.

21. The short-range RF network according to claim 15, wherein at least one of the plurality of nodes is located outside the coverage area of the at least one resource and communicates with said at least one resource by relaying through at least one other node of the plurality of nodes.

22. The short-range RF network according to claim 15, wherein the short-range RF network is a Bluetooth network.

23. A method of operating a short-range RF network, the network comprising:
a plurality of nodes connected wirelessly to each other, and to at least one resource; and
at least one mobile device wirelessly communicating with at least one of the plurality of nodes, and capable of roaming our of one node's coverage area into another node's coverage area;
and the method comprising the steps of:
periodically updating a first database for maintaining information concerning the at least one mobile device currently in communication with at least one of the plurality of nodes for each node of the short-range RF network;
in the at least one resource, periodically updating a second database including information concerning the plurality of nodes of the short-range RF network and relative information concerning the first databases of each node of the short-range RF network;
sending a request for data using the short-range RF network, the request initiated by a user of the at least one mobile device and forwarding the request to the at least one resource; and
providing the requested data to a node communicating with the at least one mobile device according to the periodically updated relative information concerning the first databases stored at the second database of the at least one resource;
wherein the node receiving the requested data determines whether the at least one mobile device is still in communication with said node, and, if the at least one mobile device is still in communication with said node according to the periodically updated information stored at the first database, the requested data is forwarded to the at least one mobile device.

24. The method according to claim 23, wherein if the determination indicates that the at least one mobile device is not in communication with said node according to the periodically updated information stored at the first database, the requested data is forwarded to a periodically updated third database for temporary storing.

25. The method according to claim 23, wherein the first database is located within each node of the short-range RF network respectively.

26. The method according to claim 23, wherein if the periodically updated relative information concerning the first databases stored at the second database of the at least one resource indicates that the at least one mobile device is not in communication with any of the plurality of nodes, the requested data is sent to a periodically updated third database for temporary storing.

27. The method according to claim 26, wherein if the periodically updated relative information concerning the first databases stored at the second database of the at least one resource indicates that the at least one mobile device has returned to communication with any of the plurality of nodes, the requested data is retrieved from the third data base and forwarded to the at least one mobile device.

28. The short-range RF network according to claim 26, wherein if the periodically updated relative information concerning the first databases stored at the second database of the at least one resource indicates that the at least one mobile device has returned to communication with a different one of the plurality of nodes, and if the requested data stored in third data base is pertinent only to a coverage area of a node with which the at least one mobile device was last in communication, data pertinent to said different one of the plurality of nodes is forwarded to the at least one mobile device.

29. The method according to claim 23, wherein the at least one resource includes a node selected to be a control node of the short-range RF network capable of communicating with other nodes of the short-range RF network and with the at least one mobile device, and the control node periodically updates a first database for maintaining information concerning the at least one mobile device currently in communication with said control node.

30. The method according to claim 23, wherein the at least one resource is further a gateway to other networks.

31. The method according to claim 23, wherein at least one of the plurality of nodes is located outside the coverage area of the at least one resource and communicates with said at least one resource by relaying through at least one other node of the plurality of nodes.

32. The method according to claim 23, wherein the short-range RF network is a Bluetooth network.

33. The method according to claim 23, wherein the requested data comprises continuous repetition of a predetermined set of data items.

34. The method according to claim 33, wherein the content of the data items is subject to updating to a value current for each repetition.

35. The method according to claim 34, wherein the requested data remains requested until actuation of a predetermined signal from the mobile terminal.

36. The method according to claim 23, wherein the requested data has a predetermined length and wherein the requested data ceases to be requested after transmission of the predetermined length of data.

37. The method according to claim 23, wherein:
the at least one resource has access to a periodically updated fourth database including information concerning mobile devices which were formerly in communication with any of the plurality of nodes during a predetermined time period;
when at least one other mobile device enters into the coverage area of any node of the plurality of nodes of the short-range RF network, the at least one resource determines whether the at least one other mobile device has been in communication with any of the plurality of nodes of the short range RF network during said predetermined time period; and
if the information stored at the periodically updated fourth database indicates that the at least one other mobile device has been in communication with any node of the plurality of nodes of the short-range RF network during said predetermined time, the at least one resource scans through periodically updated third database to determine whether there is still requested data at the temporary storage, and if requested data exists at the temporary storage, said data is provided to a node communicating with the at least one other mobile device according to the periodically updated information stored at the second database.

38. The method according to claim 37, wherein
the node receiving the data packet determines whether the at least one other mobile device is still in communication with said node according to the periodically updated information scored at the first database, and;
if the at least one other mobile device is still in communication with said node according to the information stored at the first database, the requested data is forwarded to the at least one other mobile device.

39. The method according to claim 38, wherein If the determination indicates, that the at least one other mobile device is not in communication with said node according to the periodically updated information stored at the first database, the requested data is forwarded to the periodically updated third database for temporary storing.

40. The method according to claim 37, wherein the at least one resource includes a node selected to be a control node of the short-range RF network capable of communicating with other nodes and with the at least one other mobile device, the control node comprising:
a periodically updated first database for maintaining information concerning the at least one other mobile device currently in communication with said control node.

41. The method according to claim 37, wherein the at least one mobile device and the at least one other mobile device is the same device.

42. The method according to claim 37, wherein the at least one resource is further a gateway to other networks.

43. The method according to claim 37, wherein at least one of the plurality of nodes is located outside the coverage area of the at least one resource and communicates with said at least one resource by relaying through at least one other node of the plurality of nodes.

44. The method according to claim 37, wherein the short-range RF network is a Bluetooth network.

45. A short-range RF network, the network comprising:
a plurality of nodes connected wirelessly to each other, and to at least one resource;
at least one mobile device wirelessly communicating with at least one of the plurality of nodes, and capable of roaming out of one node's coverage area into another node's coverage area; and
a periodically updated first database for maintaining information concerning the at least one mobile device currently in communication with at least one of the plurality of nodes for each node of the short-range RF network, wherein said first database is located within each node of the short range RF network respectively;
the at least one resource having a periodically updated second database including information concerning the plurality of nodes of the short-range RF network and relative information concerning the first databases of each node of the short-range RF network;
the at least one mobile device capable of sending a user-initiated request for data using the short-range RF network, the network being arranged to forward said request to the at least one resource;

the at least one resource being arranged to provide the requested data via the network to a node communicating with the at least one mobile device according to the periodically updated relative information concerning the first databases stored at the second database of the at least one resource.

46. A short-range RF network, the network comprising:

a plurality of nodes connected wirelessly to each other, and to at least one resource;

at least one mobile device wirelessly communicating with at least one of the plurality of nodes, and capable of roaming out of one node's coverage area into another node's coverage area; and a periodically updated first database for maintaining information concerning the at least one mobile device currently in communication with at least one of the plurality of nodes for each node of the short-range RF network;

the at least one resource having a periodically updated second database including information concerning the plurality of nodes of the short-range RF network and relative information concerning the first databases of each node of the short-range RF network, wherein the at least one resource is further a gateway to other networks;

the at least one mobile device capable of sending a user-initiated request for data using the short-range RF network, the network being arranged to forward said request to the at least one resource;

the at least one resource being arranged to provide the requested data via the network to a node communicating with the at least one mobile device according to the periodically updated relative information concerning the first databases stored at the second database of the at least one resource.

47. A method of operating a short-range RF network, the network comprising:

a plurality of nodes connected wirelessly to each other, and to at least one resource; and at least one mobile device wirelessly communicating with at least one of the plurality of nodes, and capable of roaming out of one node's coverage area into another node's coverage area;

and the method comprising the steps of:

periodically updating a first database for maintaining information concerning the at least one mobile device currently in communication with at least one of the plurality of nodes for each node of the short-range RF network, wherein the first database is located within each node of the short-range RF network respectively;

in the at least one resource, periodically updating a second database including information concerning the plurality of nodes of the short-range RF network and relative information concerning the first databases of each node of the short-range RF network;

sending a request for data using the short-range RF network, the request initiated by a user of the at least one mobile device and forwarding the request to the at least one resource; and providing the requested data to a node communicating with the at least one mobile device according to the periodically updated relative information concerning the first databases stored at the second database of the at least one resource.

48. A method of operating a short-range RF network, the network comprising:

a plurality of nodes connected wirelessly to each other, and to at least one resource; and at least one mobile device wirelessly communicating with at least one of the plurality of nodes, and capable of roaming out of one node's coverage area into another node's coverage area;

and the method comprising the steps of:

periodically updating a first database for maintaining information concerning the at least one mobile device currently in communication with at least one of the plurality of nodes for each node of the short-range RF network;

in the at least one resource, periodically updating a second database including information concerning the plurality of nodes of the short-range RF network and relative information concerning the first databases of each node of the short-range RF network, wherein the at least resource is further a gateway to other networks;

sending a request for data using the short-range RF network, the request initiated by a user of the at least one mobile device and forwarding the request to the at least one resource; and providing the requested data to a node communicating with the at least one mobile device according to the periodically updated relative information concerning the first databases stored at the second database of the at least one resource.

* * * * *